March 21, 1944.   J. W. MacCLATCHIE   2,344,713
STARTING STALL
Filed March 1, 1943
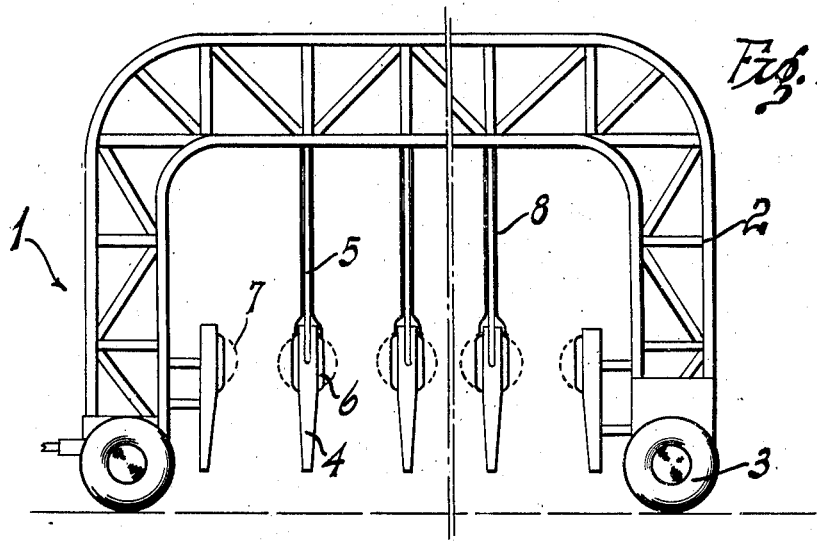
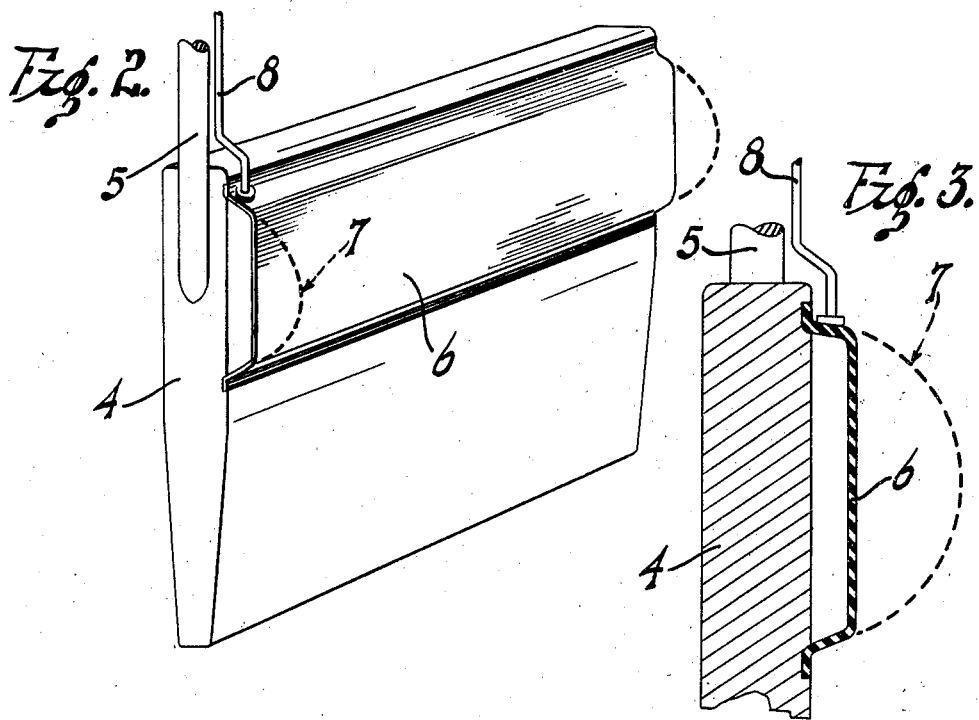
Inventor
JOHN WARREN MacCLATCHIE.
By
Attorney Patented Mar. 21, 1944

2,344,713

UNITED STATES PATENT OFFICE 2,344,713

STARTING STALL

John Warren MacClatchie, Compton, Calif.

Application March 1, 1943, Serial No. 477,611

4 Claims. (Cl. 119—15.5)

This invention relates to a novel starting stall used in horse racing. The stalls in starting gates heretofore in use were considerably wider than the horse and, therefore, the horse would not necessarily have to stand straight in its stall. When the starting gate was tripped, the horse due to the fact that it was not held in line in its stall would bump adjacent horses or would be thrown off its stride.

An object of my invention is to provide a novel extensible means in each of the stalls of a starting gate, which extensible means are operated after the horse is led into the stall, thus causing the horse to be moved into proper alignment in its stall.

Another object of my invention is to provide a novel starting stall in which the extensible means can be actuated after the horse has been led into the stall. This object is desirable due to the fact that many horses will not enter a narrow stall.

A feature of my invention is to provide a novel starting stall with inflatable members on the sides thereof, said members being inflated and extended after the horse is in the starting stall.

Another object of this invention is the safety feature that it affords the jockey. The expandable boots on either side of the stall wall when expanded leave a space between the main wall of the stall and the horse's body for the jockey's feet and legs. Jockeys are often hurt by the horse crowding up against one side or the other of the stall, and pinching the jockey's feet or legs in so doing.

Another object of the invention is to have these expandable members operate as slowly and quietly as possible. By utilizing air in the manner shown, I claim that the horse will be unaware of its operation due to its gradual and silent operation. If this device were made with levers and toggle joints of metal, it would no doubt be noisy in operation, as the entire stall and gate is subject to all kinds of weather conditions.

Other objects, advantages, and features of invention may appear from the accompanying drawing, the subjoined detailed description, and the appended claims.

In the drawing

Figure 1 is a fragmentary front elevation of a starting gate showing my extensible means mounted in the stalls.

Figure 2 is a perspective view of one side of a starting stall with my extensible means mounted thereon.

Figure 3 is a fragmentary longitudinal sectional view of a side of a starting stall and a flexible member mounted thereon.

Referring more particularly to the drawing, the starting gate 1 comprises the usual frame 2, mounted on wheels 3, and with a plurality of spaced partitions 4 suspended from the frame 2, by means of hangers 5. The partitions 4 are spaced a considerable distance apart so as to provide a relatively wide stall into which the racing horse can be moved prior to starting the race. In order to urge the horse into the center of the stall and also in proper alignment with the track, I provide an extensible member formed of flexible material such as rubber and extending longitudinally of each of the partitions 4 for the full length thereof. The member 6 may be a completely closed structure, or it may be suitably attached to the partition, and effectively sealed to the partition, substantially as shown in Figure 3, and in this event the partition itself forms part of the structure. The member 6 is inflated after the horse is in the stall with air, or other fluid, the extended position being shown in dotted lines indicated at 7.

The edges of the material comprising the expansible chamber member 6 may be secured to the side walls of the respective partitions in any suitable manner, and further in such a way as to be maintained in secured relation thereto when inflation takes place.

A conduit 8 extends to and communicates with each of the members 6, and these conduits extend upwardly to the framework 2, and thence to a suitable valve, not shown since a control valve is usual and well known. Once the members 6 are extended, the horse will be urged to the center of the stall and will be held in proper alignment with the track.

Having described my invention, I claim:

1. In combination with a starting gate, including spaced partitions, a flexible expansible member mounted on each of the partitions and extending longitudinally thereof, and means to inflate said member.

2. In combination with a starting gate, including spaced partitions forming stalls therebetween, extensible means mounted on the opposite sides of the partitions and extending longitudinally for substantially the full length thereof, said extensible means adapted to press against the body of a horse occupying each stall for urging the animal into alignment with a race track on which the starting gate is positioned.

3. In combination with a starting gate, including spaced partitions, a flexible expansible member mounted on each of the partitions and extending longitudinally thereof, and means for inflating the member including a conduit having communication with the member for conducting fluid under pressure to said member.

4. In combination with a starting gate, including spaced partitions forming stalls therebetween, a flexible member on each side of each partition and having its edges secured thereto and extending longitudinally for substantially the full length thereof, said flexible members cooperating with the respective partitions to provide expansible chambers, and means for delivering a fluid under pressure to each chamber to expand the same and move the flexible member away from the side of its partition to an operative position.

JOHN WARREN MacCLATCHIE.